United States Patent [19]

Coon et al.

[11] 4,403,148
[45] Sep. 6, 1983

[54] ELECTRO-OPTICAL SCANNING AND DISPLAY SYSTEM

[75] Inventors: Bryan H. Coon, Plano; Wallace A. Kluck, Richardson; Billy W. Radke, Garland, all of Tex.

[73] Assignee: Optic-Electronic Corporation, Dallas, Tex.

[21] Appl. No.: 261,491

[22] Filed: May 7, 1981

[51] Int. Cl.³ .......................................... H01J 31/50
[52] U.S. Cl. .................................... 250/332; 250/334; 358/113
[58] Field of Search .............. 250/330, 332, 334, 349; 358/113

[56] References Cited

U.S. PATENT DOCUMENTS

| | | | |
|---|---|---|---|
| 3,660,663 | 5/1972 | Guilford et al. | 250/332 |
| 3,781,559 | 12/1973 | Cooper et al. | 250/334 |
| 3,808,435 | 4/1974 | Bate et al. | 250/332 |
| 3,886,359 | 5/1975 | Cheek, Jr. et al. | 250/334 |
| 3,889,117 | 6/1975 | Shaw, Jr. | 250/334 X |
| 3,947,826 | 3/1976 | Bockwoldt | 340/173 R |
| 4,103,109 | 7/1978 | Maeding | 179/15 A |
| 4,121,250 | 10/1978 | Huelsman | 358/140 |
| 4,122,311 | 10/1978 | Klatt et al. | 179/15 BL |
| 4,127,781 | 11/1978 | Sato | 250/562 |
| 4,152,588 | 5/1979 | Klatt et al. | 250/230 |
| 4,212,072 | 7/1980 | Huelsman et al. | 364/515 |

Primary Examiner—Davis L. Willis
Attorney, Agent, or Firm—Hubbard, Thurman, Turner & Tucker

[57] ABSTRACT

An electro-optical system including a scanning mirror for scanning an image across an array of radiation detectors. An analog signal generated by the scanning mechanism is utilized to provide a sweep signal in a first axis. A second sweep signal in another axis is operated independently of the first sweep signal. The outputs of the detector array are electronically multiplexed through a plurality of channels and integrated between successive samplings of each detector. A provision for equalizing the outputs of each detector in the array is included. The output of the electronic multiplexer may be utilized to provide a video display in conjunction with the sweep signals, or may be applied to a conventional optical display.

31 Claims, 15 Drawing Figures

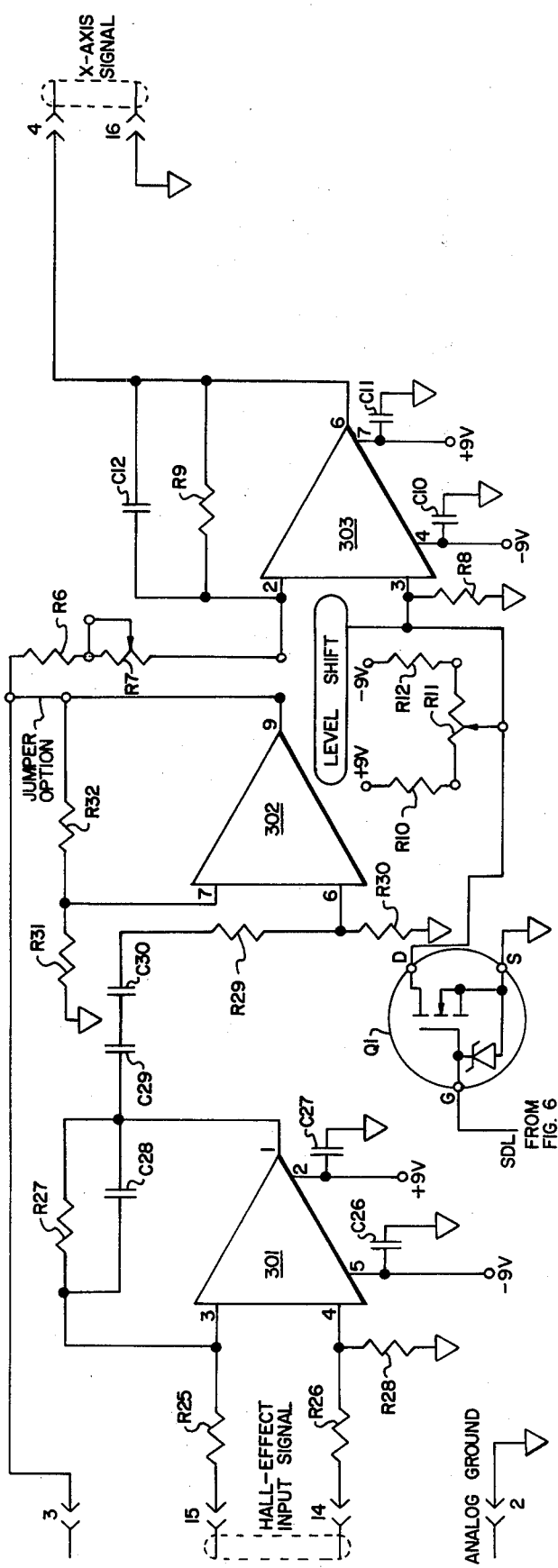
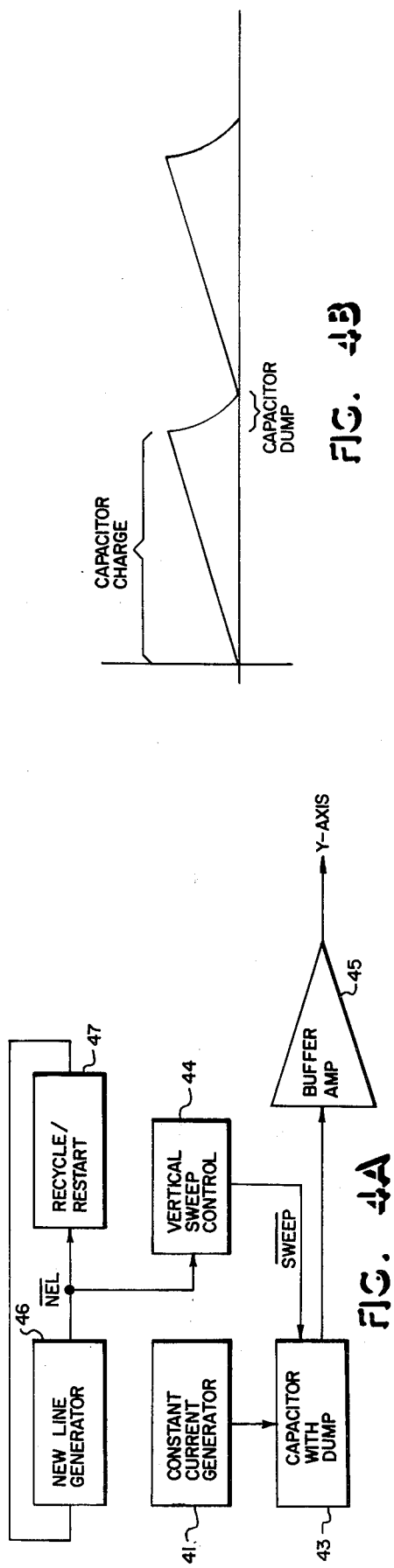

ELECTRO-OPTICAL SCANNING AND DISPLAY SYSTEM

BACKGROUND OF THE INVENTION

This invention relates to radiation detection and display systems and more particularly to systems wherein the outputs of the detectors are electronically multiplexed to create a video display signal.

DESCRIPTION OF THE PRIOR ART

One method known in the art of generating a visible real-time image in a radiation detection system is disclosed in U.S. Pat. No. 3,781,559, issued to Cooper et al. Cooper et al teaches the utilization of a plurality of light emitters coupled to an array of detectors. The emitters are then photographed with a television camera and the resultant video signal is coupled to a television display to produce a visible image.

Other methods of producing visible images which correlate to detected radiation energy are seen in Guildford et al, U.S. Pat. No. 3,660,663, Bate et al, U.S. Pat. No. 3,808,435 and Shaw Jr., U.S. Pat. No. 3,889,117. Each of the aforementioned U.S. patents teaches a method of multiplexing detector outputs to create a video signal. Many problems have been encountered in these prior art attempts to multiplex detector outputs into a video signal, including: producing flicker-free displays at the low speed multiplexer rates available; correlation of a visible display scan time with the radiation detector scan time; and, the presence of buss capacitance in known multiplexer circuitry, which tended to limit sample rates.

SUMMARY OF THE INVENTION

It is, therefore, an object of this invention to provide an improved radiation detection and imaging system.

It is another object of this invention to provide a detection and imaging system wherein the output of the detectors is electronically multiplexed to create a video display signal.

It is yet another object of this invention to provide a multiplexer system capable of high speed multiplexing.

The foregoing objects are achieved as is now described. An imaging system is provided which includes a scanning mirror for scanning an image across an array of radiation detectors. An analog electronic signal, typically associated with such a scanning system, is utilized to provide a first sweep signal in a first axis. A second sweep signal in another axis is generated in conjunction with the sampling of the individual radiation detectors, and is operated independently of the first sweep signal. The outputs of the individual radiation detectors in the array are electronically multiplexed through a plurality of channels and integrated between successive samplings of each detector to provide a more accurate indication of channel output. The output of the electronic multiplexer may be utilized to provide a video display in conjunction with or in place of light emitting diode displays to provide remote, electronic video display.

BRIEF DESCRIPTION OF THE DRAWINGS

The novel features believed characteristic of the invention are set forth in the appended claims. The invention itself; however, as well as a preferred mode of use, further objects and advantages thereof, will best be understood by reference to the following detailed description of an illustrative embodiment when read in conjunction with the accompanying drawings, wherein:

FIG. 3 is a schematic diagram of the X-axis circuitry of the imaging system;

FIG. 4a is a block diagram of the Y-axis circuitry of the imaging system;

FIG. 4b is a voltage waveform depicting the Y-axis signal;

FIG. 6 is a schematic diagram of the interlace circuitry of the imaging system;

DETAILED DESCRIPTION

Figure 1:
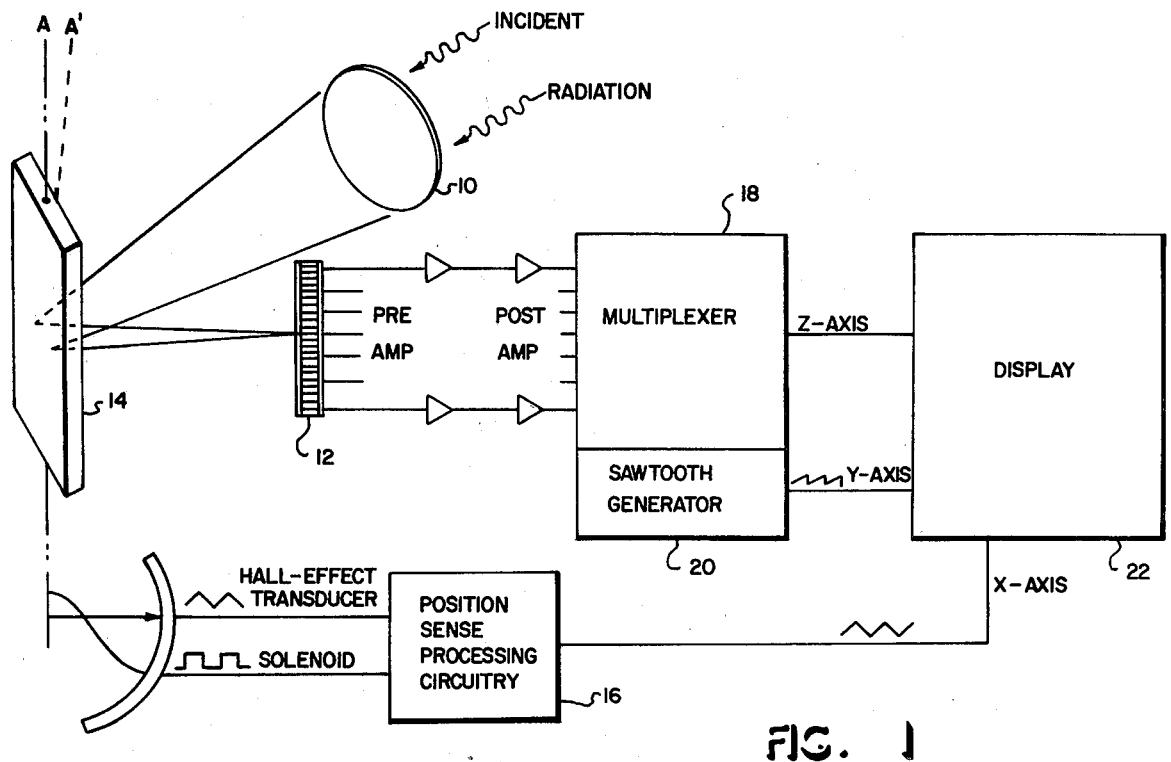
FIG. 1 is a block diagram of the major sections of the detection and imaging system.

With reference now to FIG. 1, a block diagram of the major sections of the detection and imaging system is depicted. Incident radiation, infrared in a preferred embodiment, is focused onto scanning mirror 14 by means of optics 10. In the manner well known in the art, scanning mirror 14 is rotated in such a manner as to reflect incoming radiation across detector array 12. Detector array 12 preferably comprises an array of radiation detectors which are typically spaced approximately 0.004 inch apart. Each detector then detects a single horizontal stripe of the incident radiation. To correct the detected image for the spaces between adjacent detectors, the scanning mirror 14 is tilted slightly from axis A to axis A' on each successive scan. Therefore, the information lost between detectors in the array in one pass is retrieved during the next pass. The outputs of the individual detectors of detector array 12 are then amplified utilizing a series of preamplifiers and postamplifiers, achieving a total electronic amplification in the area of $10^6$. The amplified outputs of the individual detectors are then applied to multiplexer 18 and sequentially sampled to provide the Z-axis signal, which is utilized as the video signal. Sawtooth generator 20 operates with multiplexer 18 to provide a sawtooth or ramp signal which is generated in conjunction with the sequential sampling of individual detector outputs and utilized as the Y-axis signal. In a standard application of the so-called "common module" radiation detection system, a Hall-effect transducer is utilized in conjunction with a permanent magnet mounted on the scanning mirror to provide an electronic signal indicative of the instantaneous position of scanning mirror 14. The output of such a device, depicted as one input to position sense processing circuitry 16, is typically a triangular waveform. Similarly, the square wave solenoid signal of the torque motors utilized to drive scanning mirror 14 may be utilized to determine the direction of rotation of scanning mirror 14. Position sense processing circuitry 16 amplifies and filters the output of the Hall-effect transducer and utilizes that signal in conjunction with the scan direction signal to provide an X-axis sweep signal to display 22. As long as a one-to-one correspondence exists between the position of the scanning mirror and the position of the electron beam in a video display, the geometric proportions of the detected image will not be altered at all by the independent sampling rate employed to sample the detector array. Display 22, in a preferred embodiment, comprises a cathode ray tube display utilized to generate a visual image which corresponds to the radiation detected by the system of FIG. 1. An electrostatically deflected cathode ray tube, such as the Hewlett-Packard 1332A may be utilized to provide display 22. The output of multiplexer 18 is connected to the Z-axis of the display and modulates the intensity of the spot created by the electron beam. Sawtooth generator 20 is connected to the Y-axis input and drives the electron beam vertically upward across the display at a constant speed, and brings the beam rapidly down at the end of each sweep. The output of position sense processing circuitry 16 is coupled to the X-axis of the display and drives the beam horizontally back and forth. The signal transfer function of multiplexer 18 is selected for maximum visibility with inputs which are compatible with standard light emitter displays, in order to provide an optical display in addition to or in place of the video display technique disclosed herein.

HORIZONTAL SWEEP CIRCUITRY

Figure 2A:
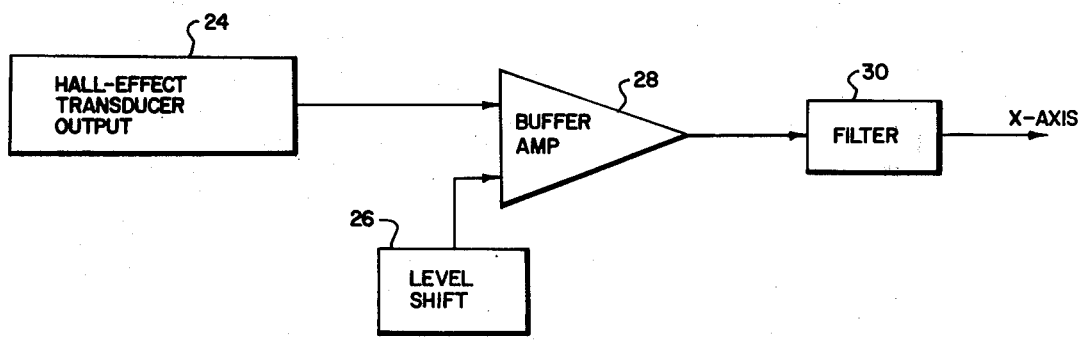
FIG. 2a is a block diagram of the X-axis circuitry of the imaging system.
Figure 2B:
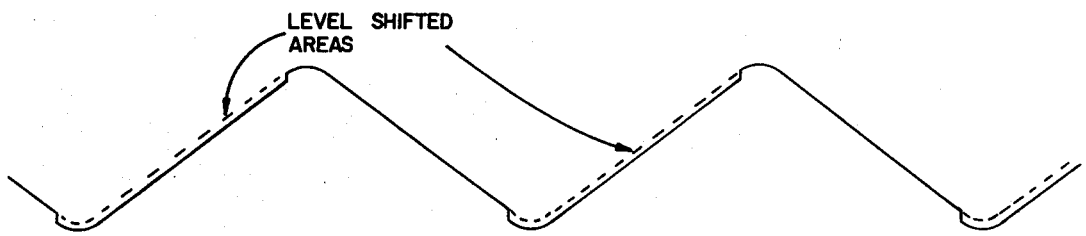
FIG. 2b is a voltage waveform depicting the X-axis signal, and associated level shift.

With reference now to FIG. 2a, there is depicted a simple block diagram of the components comprising the X-axis circuitry of the imaging system. The triangular waveform output of the Hall-effect transducer 24 is applied to a buffer amplifier 28. A level shift circuit 26 is also applied to buffer amplifier 28 to generate a controlled level shift in conjunction with the output of the Hall-effect transducer, for reasons which will be explained in detail herein. The output of buffer amplifier 28 is filtered by filter 30 and is provided to display 22. FIG. 2b depicts a typical X-axis signal utilized by the detection and imaging system of this invention, including the level shift portion previously discussed.

With reference now to FIG. 3, there is depicted a schematic diagram of the X-axis circuitry of the imaging system. The triangular waveform output of the Hall-effect transducer is applied to pins 14 and 15. The triangular waveform is coupled to operational amplifiers 301 and 302 and is both amplified and filtered to acceptable levels. The output of operational amplifier 302, present at pin 9, is coupled through the depicted jumper option to the input of operational amplifier 303. The jumper option will permit the use of an independent synchronized triangular waveform signal that has been previously amplified. It has been determined that in alternate applications wherein a Hall-effect transducer output is not available, this independently generated synchronized triangular waveform will provide a suitable sweep signal. In those applications, the independently generated waveform may be applied to pin 3, and thence to pin 2 of operational amplifier 303. Operational amplifier 303 amplifies the sweep waveform and applies the level shift portion depicted in FIG. 2b. The level shift signal is utilized to compensate for possible distortion due to filtering, electronic delays and mechanically derived effects. The level shift is an adjustable correction voltage which is applied during one half of the sweep signal to permit horizontal alignment in the display system. Horizontal alignment is necessary for all of the above-mentioned factors and additionally, the phase shift which occurs in multiplexer 18 due to the integration of each detector output. As the scanning mirror and electron beam scan in one direction, the output of each detector is integrated between samplings. Thus, the sample integrated between points N and N+Δ will be displayed at the electron beam position which corresponds to point N+Δ. On the return scan, in the opposite direction, the sample integrated between points N+Δ and N will be displayed at the electronic beam position which corresponds to point N. Therefore, without a correction level shift, the image data for the same point would be displaced in two successive scans by the distance Δ. Resistors R10, R12, and R11 are utilized to determine the correction level to be applied. Transistor Q1, is controlled by the square wave solenoid signal from the scanning mirror torque motors, to ensure that correction is only applied during one half of the sweep signal. Transistor Q1 controls the application of the correction voltage to pin 3 of operational amplifier 303. The output of operational amplifier 303 now represents the amplified, filtered and level shifted signal seen in FIG. 2b.

SYSTEM TIMING

Figure 8:
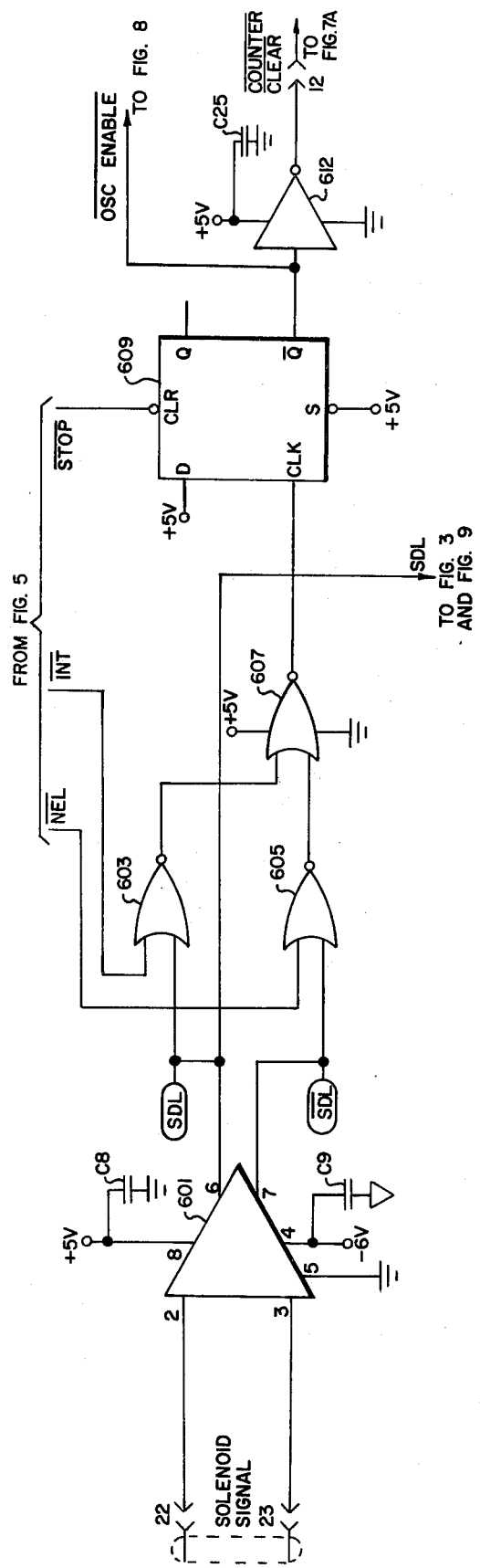
FIG. 8 is a schematic diagram of the multiplexer clock system of the imaging system.

Referring now to FIG. 8, the timing circuitry of the scanning and display system is depicted. Oscillator 801 is utilized to provide the basic system clock (MCL). Oscillator 801, in a preferred embodiment, comprises a voltage controlled oscillator, which may be embodied as an integrated circuit, such as the 54S124. When oscillator 801 is enabled, by the $\overline{\text{OSC ENABLE}}$ signal at pin 6, the output is coupled to serial out generator 802. Serial out generator 802 detects the output of oscillator 801 and generates the SERIAL OUT signal which is utilized to sequentially sample the output of each multiplexer channel, in a manner which will be explained herein. A signal indicating the last multiplexer channel has been sampled is then utilized to reset serial out generator 802. Serial out generator 802 may, in a preferred embodiment, be implemented with a simple integrated circuit multivibrator, such as the 54LS74.

VERTICAL SWEEP CIRCUITRY

FIG. 4a depicts a block diagram of the Y-axis circuitry of the scanning and display system. As stated earlier, the Y-axis signal is preferably a sawtooth or ramp signal, the rise time of which is correlated to the amount of time required to sample all channels in a particular embodiment. While numerous methods of generating such a signal are known, the illustrated embodiment utilizes a constant current source 41 to charge a capacitor, which may be selectively discharged utilizing capacitor and dump circuit 43. The discharge of the capacitor is initiated by the $\overline{\text{SWEEP}}$ signal, indicating the last multiplex channel has been sampled. The $\overline{\text{SWEEP}}$ signal is generated by vertical sweep control circuit 44, in conjunction with new line generator 46. Recycle/restart circuit 47, is utilized to ensure initial startup and continued operation. The voltage waveform across the capacitor in capacitor and dump circuit 43 is depicted in FIG. 4b. The voltage across the capacitor is constrained to a linear rise, rather than the typical exponential rise, by the utilization of a constant current source as the charging medium. A rapid discharge is obtained by dumping the accumulated charge through a small resistance, and, as can be seen in FIG. 4b, this results in an exponential discharge curve.

Figure 5:
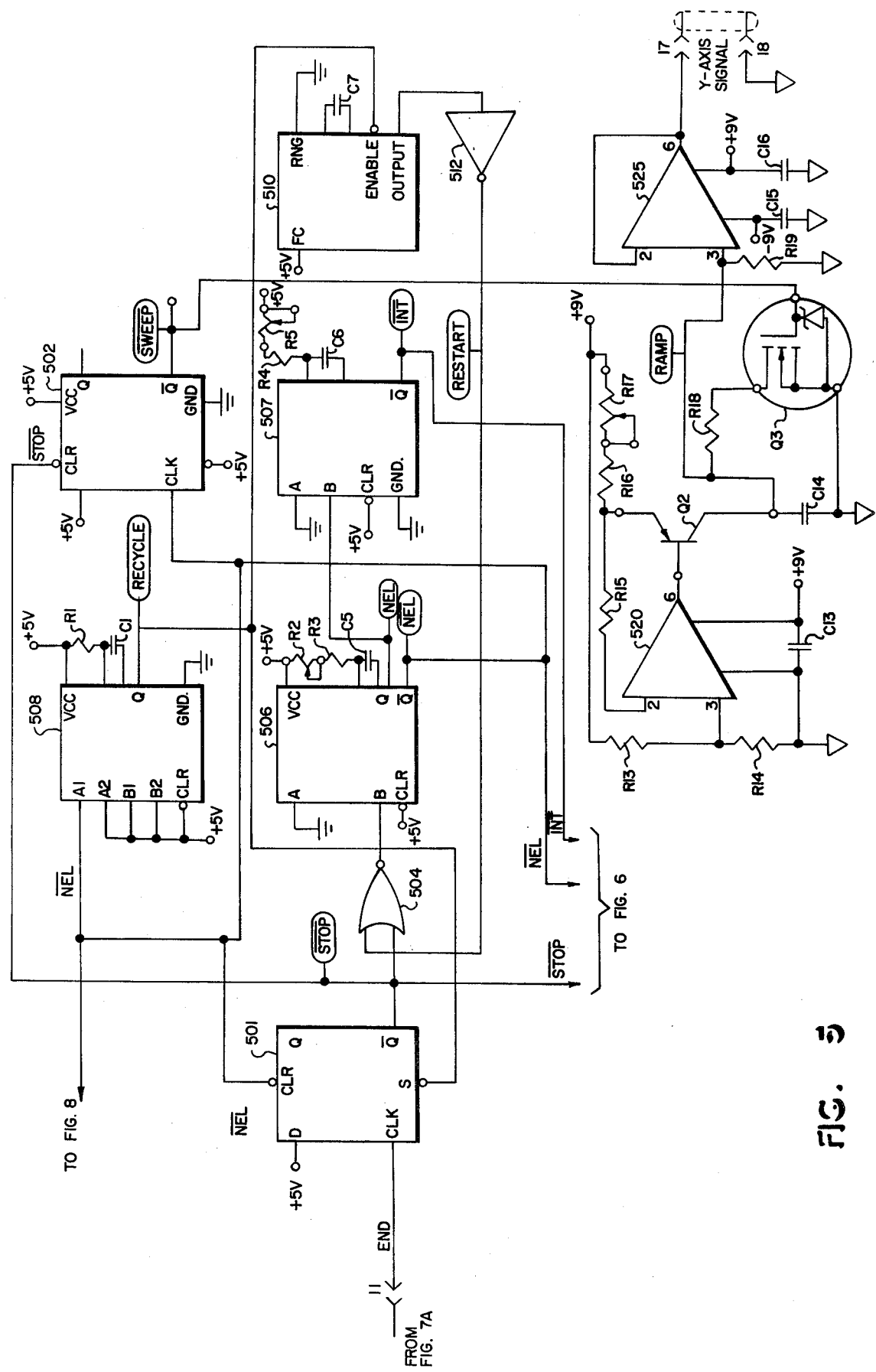
FIG. 5 is a schematic diagram of the Y-axis circuitry of the imaging system.

A schematic diagram of the Y-axis circuitry may be seen in FIG. 5. Stop code generator 501 is triggered by the END signal from the multiplexer, indicating the last detector in the array has been sampled. Stop code generator 501 may be implemented with a simple flip-flop circuit, and is utilized to generate the $\overline{\text{STOP}}$ signal. The $\overline{\text{STOP}}$ signal is applied to NOR gate 504 with the RESTART signal and the output of NOR gate 504 is applied to new line generator 506. New line generator 506, in a preferred embodiment, is a monostable multivibrator utilized as a one-shot. The pulse length output of new line generator 506 is selected utilizing R2, R3 and C5. The new line signals (NEL and $\overline{\text{NEL}}$) are utilized throughout the Y-axis and interlace circuits, and are utilized to clear stop code generator 501.

The $\overline{\text{STOP}}$ signal is also coupled to sweep control 502. Sweep control 502 may also be implemented with a simple flip-flop circuit and is utilized to control the charge and discharge of capacitor C14. Sweep control 502 utilizes the $\overline{\text{SWEEP}}$ signal to control the charge and discharge of capacitor C14, by controlling transistor Q3. A $\overline{\text{NEL}}$ signal applied to sweep control 502 starts a charging cycle and the $\overline{\text{STOP}}$ signal allows the accumulated charge to be discharged rapidly. The $\overline{\text{SWEEP}}$ signal is applied to the gate of transistor Q3 to control the charge and discharge of capacitor 14. Operational amplifier 520 and the biasing network formed by resistors R13, R14, R15, R16 and R17 is utilized to provide a constant charging current for capacitor C14 through transistor Q2. The $\overline{\text{SWEEP}}$ signal controls transistor Q3 in a manner which allows capacitor C14 to rapidly discharge through resistor R18. Resistor R18 is selected, in a preferred embodiment, to be a relatively low resistance value in order to allow rapid discharge of capacitor C14. Transistor Q3, in the embodiment disclosed, is implemented with an integrated circuit VMOS FET, such as the 2N6659. The voltage present on capacitor C14 is applied to operational amplifier 525 for amplification and is utilized to provide a Y-axis sweep signal in the display system of the present invention.

The NEL signal is applied to interlace timer 507, a monostable multivibrator utilized as a one-shot, in the same manner as new line generator 506. The pulse length of interlace timer 507 is controlled utilizing resistors R5, R4 and capacitor C6. The pulse length of interlace timer 507 is selected to differ slightly from that selected for new line generator 506, in order to produce an interlace signal ($\overline{\text{INT}}$) which will be utilized in conjunction with the $\overline{\text{NEL}}$ signal to produce an increase in video resolution.

The $\overline{\text{NEL}}$ signal is also applied to recycle generator 508, a retriggerable one-shot, which is implemented in the illustrated embodiment, with an integrated circuit such as the 54S122. As long as the $\overline{\text{NEL}}$ signal is being generated by new line generator 506, recycle generator 508 will continue to output a signal labeled RECYCLE. The RECYCLE signal is utilized to set stop code generator 501, and to enable restart oscillator 510. Restart oscillator 510 is a voltage controlled oscillator which is utilized to generate the $\overline{\text{RESTART}}$ signal. The output of restart oscillator 510 is inverted by inverter 512 to generate the RESTART signal. The RESTART signal is necessary during power up stages of operation, since the END signal will not necessarily be generated from the miltiplexer, and a new line signal is necessary to begin operation. The RESTART signal is applied to NOR gate 504, and begins operation of the system in a manner identical to that described with respect to the $\overline{\text{STOP}}$ signal.

INTERLACE CIRCUITRY

In order to maximize the resolution of the video image produced with the scanning and display system, a system of electronic interlace is provided. Thus, as scanning mirror 14 completes a scan in one direction, reverses scanning direction (as detected by a change of state in the solenoid signal from the torque motors) and tilts slightly to compensate for information lost between detectors on the previous scan, the sampled outputs of each detector in the next scan are utilized to control the intensity of the electron beam in the video display directly over the previously generated display. Those ordinarily skilled in the art will recognize this as commonly referred to as interlace. The circuitry which accomplishes this interlace is depicted in schematic form in FIG. 6.

The solenoid signal generated in the scanning mirror torque drive motors, is applied to comparator 601 to be compared with ground. The outputs of comparator 601 (labeled SDL and $\overline{\text{SDL}}$) are complemented signals indicative of the direction of scan of scanning mirror 14. These complemented signals are applied to NOR gates 603 and 605 with the $\overline{\text{NEL}}$ and $\overline{\text{INT}}$ signals. The outputs of NOR gates 603 and 605 are then applied to NOR gate 607. The output of NOR gate 607 then represents the presence of simultaneous low states on the SDL signal and the $\overline{\text{INT}}$ signal or simultaneous low states on the $\overline{\text{SDL}}$ signal and the $\overline{\text{NEL}}$ signal, and is utilized to trigger oscillator enable latch 609. Oscillator enable latch 609 thus enables oscillator 801 (see FIG. 8) at a selected time at the beginning of each scan, a time which may be selected by controlling the pulse length of new line generator 506 and interlace timer 507 (see FIG. 5). The delay in enabling oscillator 801 is controlled so that the sampling of the detector array is delayed slightly in one scan direction. This delay causes the resulting video signal to be slightly higher in the display than it was during the previous scan, having begun at a higher point on the sawtooth (Y-axis) signal. The delay may be controlled to achieve that degree of interlace which is desired, as a matter of design choice. It should therefore be apparent that the intensity of the display due to the output of a given detector may then be interlaced with the intensity of the display due to the output of the same detector from the previous scan.

ELECTRONIC MULTIPLEXER CIRCUITRY

Figure 7A:
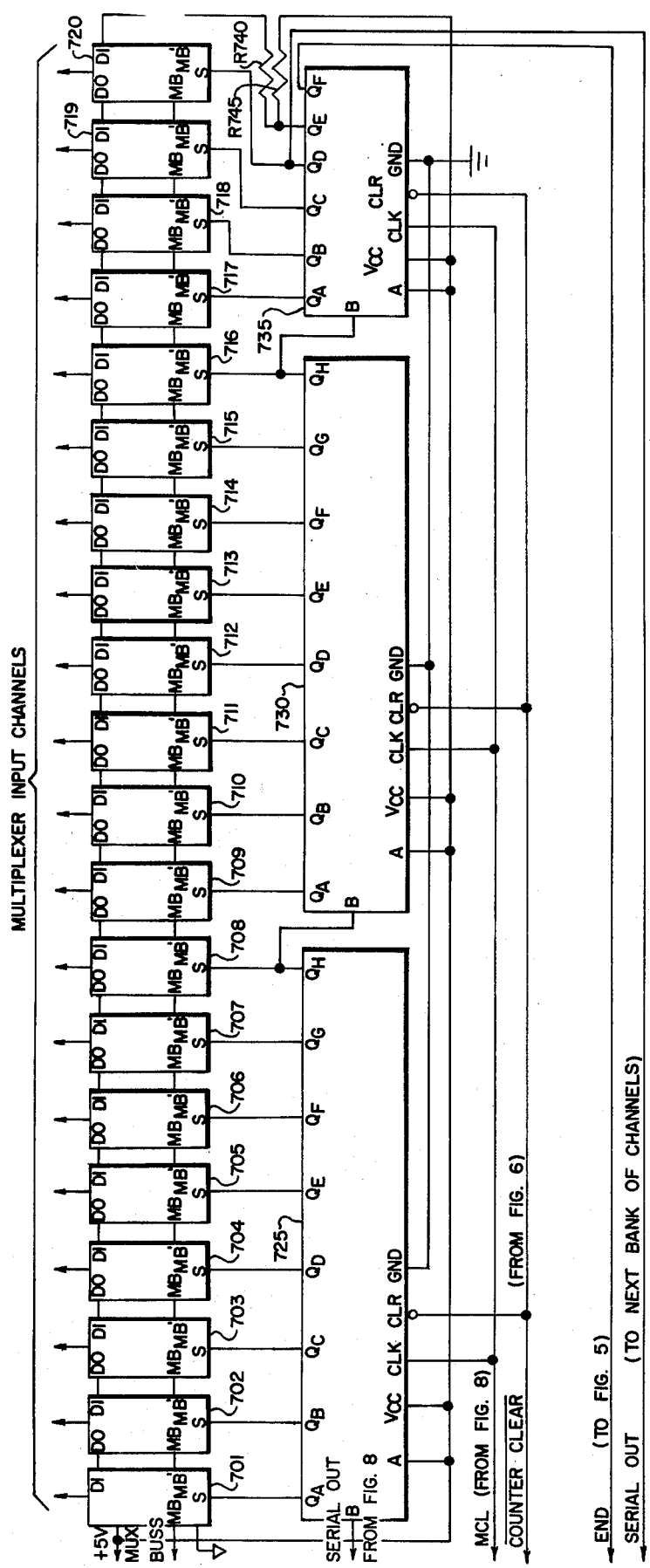
FIG. 7a is a block diagram of a typical bank of twenty multiplexer channels of the imaging system.

Referring now to FIG. 7a there is depicted a typical bank of twenty multiplexer channels, 701–720. It should be appreciated, however, that any number of detectors and corresponding multiplexer channels may be utilized, also as a matter of design choice. Also, in those design applications wherein an optical output is also desired, the output of each detector may be coupled to an array of light emitters, such as is seen in the Cooper et al, U.S. Pat. No. 3,781,559, in addition to the electronic multiplexer disclosed herein. The bank of multiplexer channels depicted includes twenty channels labeled 701–720, each of which corresponds to a single radiation detector in detector array 12. Also included in the multiplexer bank are shift register 725, 730 and 735.

Recalling that the output of serial out generator 802 of FIG. 8 is utilized to sequentially sample the outputs of each multiplexer channel, it should be noted that the input to shift register 725, at pin B, is the aforementioned SERIAL OUT signal. This SERIAL OUT signal is clocked through shift register 725 at the basic system clock rate (MCL), and into shift register 730. As the pulse propagates through the serially connected shift registers, it is utilized to select each multiplexer channel in sequence. As the SERIAL OUT pulse reaches the end of shift register 735, one of two series of events may occur. In those design applications wherein multiplexer channel 720 is the last detector to be sampled, the output of shift register 725 at pin QF is utilized as the END signal, to indicate to stop code generator 501 (see FIG. 5) that the last detector has been sampled. In alternate design applications wherein another similar bank of multiplexer channels is utilized, the SERIAL OUT pulse is output from shift register 735 at pin QD, and subsequently serves as the serial out input to the first shift register in the next bank of channels.

Figure 7B:
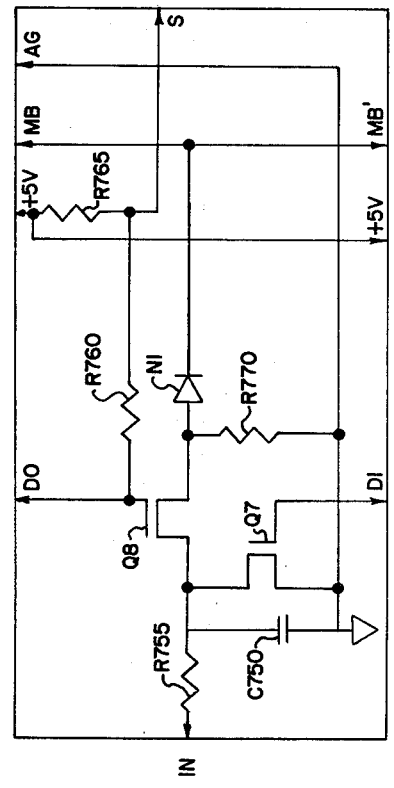
FIG. 7b is a schematic diagram of a single multiplexer channel of the imaging system.
Figure 9:
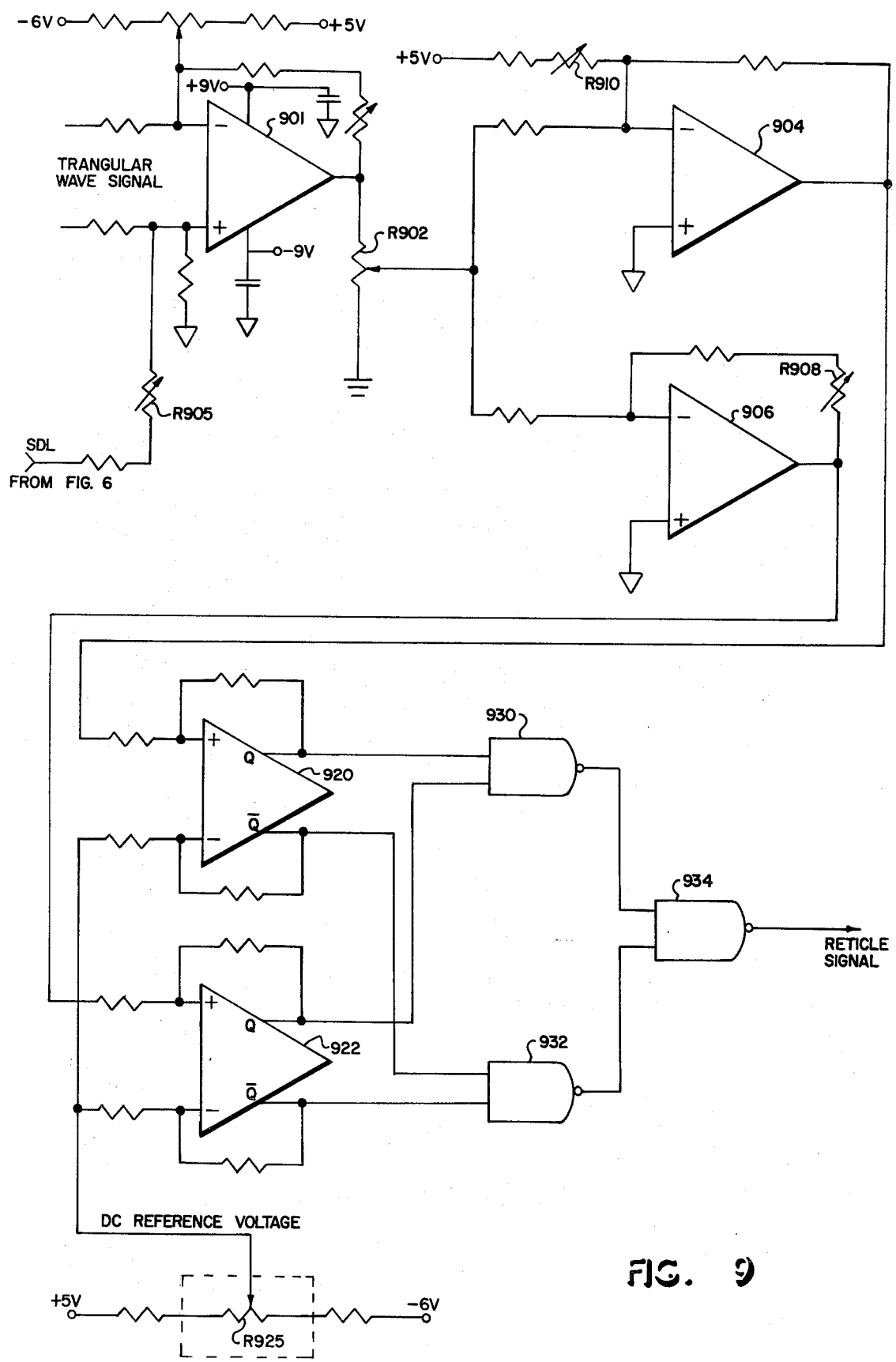

In FIG. 7b, a schematic diagram of a preferred embodiment of a single multiplexer channel is depicted. The output of each individual detector is applied to a series of preamplifiers and postamplifiers in a manner well known in the art. The output of the final postamplifier of each detector is then applied to the input of a multiplexer channel. When a particular channel of the multiplexer is selected, the output voltage of that channel is representative of the average voltage output from that detector over the time period which has occured since the previous selection of that channel. This voltage averaging is accomplished by integrating the output of the final postamplifier in each channel across resistor R755 and capacitor C750. Thus, the voltage present on capacitor C750 will represent the integral of the voltage present during the time period the charge was allowed to accumulate.

For increased accuracy in the scanning and display system of the present invention, an equal test input may be applied to each detector in the detector array, and the output of each multiplexer channel may then be examined. Resistor R755 may then be selected or trimmed to equalize the outputs of each channel in the multiplexer. In this manner, processing variations in the detector elements or multiplexer circuit components may be easily compensated for, with a resultant increase in system accuracy.

The sampling of this average voltage level and subsequent zeroing out of the charge on capacitor C750 is accomplished by transistors Q7 and Q8. In the embodiment disclosed, the transistors Q7 and Q8 are both implemented with a single VMOS FET type device; however, for the sake of simplicity, discreet transistors are shown in the schematic representation of FIG. 7b. Transistor Q8, when conducting, allows the voltage present on capacitor C750 to be read onto the common multiplexer buss, through diode N1, to the multiplexer load resistor. Transistor Q7, connected across capacitor C750, ensures the capacitor will discharge rapidly after sampling, thus assuring an accurate reading at the next sample. Referring again briefly to FIG. 7a, it is noted that the D0 pin of any single multiplexer channel is coupled to the D1 pin of the previous multiplexer channel. Those skilled in the art will appreciate that this arrangement will allow the pulse which selects the sample transistor (Q8) of a particular channel will also select the dump transistor (Q7) of the previously sampled channel. This feature allows simplification of control circuitry and ensures the accuracy of consecutive readings of each channel by assuring a zero voltage starting point in each channel.

Diode N1, in each multiplexer channel, performs several important functions in the disclosed embodiment. The sample and dump transistors Q7 and Q8, are implemented as discussed above, with a VMOS FET type transistor such as the 2N6659. Transistors such as the 2N6659 include a built in zener diode between the gate and source, to protect the gate capacitor from the effects of overvoltage (see transistor Q3 in FIG. 5). When a particular multiplexer channel is not selected, the input to the channel at pin S, is at approximately ground potential. Thus, without diode N1 in the circuit, the output of the multiplexer buss will include the forward biased zener diode of each non-selected channel in parallel with the load resistor. This will result in an increase in multiplexer buss loading which is directly proportional to the number of of channels in the system. The addition of diode N1 in each channel creates an effective circuit which includes the forward biased zener diode in series with the reversed biased diode N1 both of which are in parallel with the multiplexer buss output. This effective high impedance circuit has the effect of isolating the built in zener diode of the sample and dump transistors and thus prevents the buss from being loaded down. Additionally, the capacitance of diode N1 acts to isolate the drain to source and gate to source capacitance of the sample transistors, thus decreasing buss capacitance. Decreased buss capacitance has the desirable effect of decreasing output response time and decreasing objectionable crosstalk between adjacent multiplexer channels.

This utilization of diode N1 necessitates the inclusion of resistor R770, to provide a low impedance path for the sample transistor leakage current. Resistor R770 also provides a charge path for drain to source capacitance while capacitor C750 is collecting charge data indicative of the average voltage output of the post amplifier. Without resistor R770, the high impedance path created by the diode N1 and the multiplexer buss output resistor will result in a slow charge and undesirable voltage present at the output resistor. The voltage developed across resistor R770 would have to exceed the knee voltage of diode N1 to result in an erroneous output voltage, a circumstance which does not occur in actual practice.

RETICLE GENERATION CIRCUITRY

Figure 9:
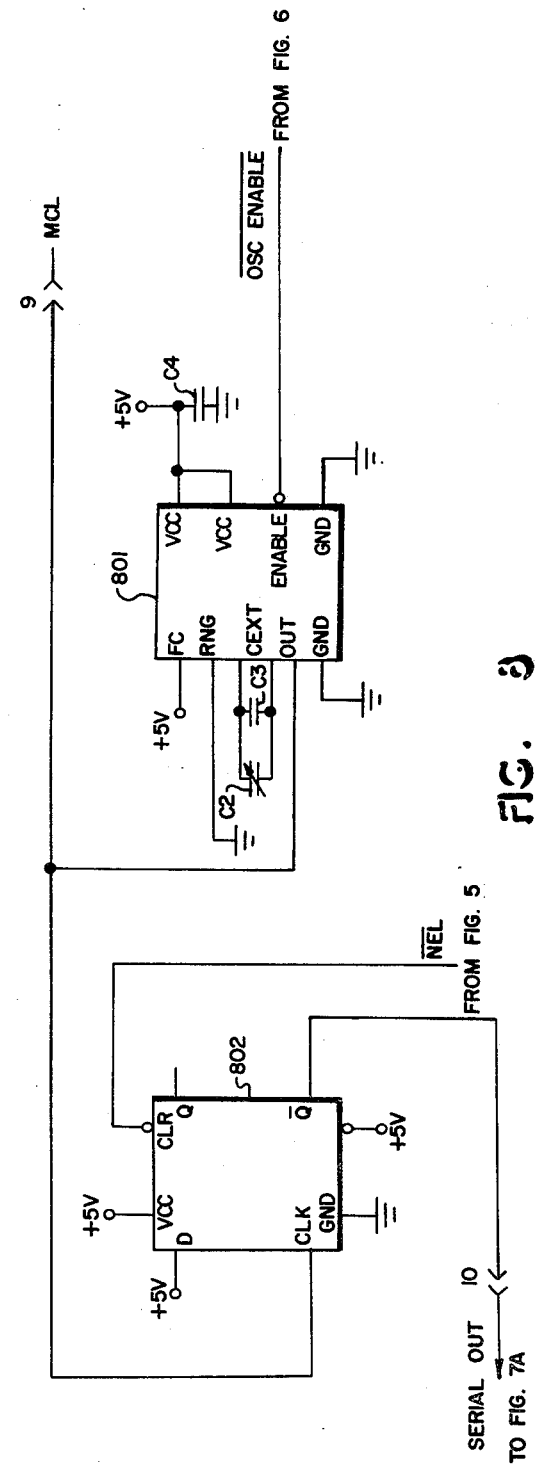
FIG. 9 is a schematic diagram of the vertical reticle injector circuitry.

In certain applications, it is useful to employ a horizontal and vertical reticle or crosshair, in order to accurately aim the scanning system of the present invention. While a horizontal reticle may be simply generated by constraining a single detector in the array to a desired value (the middle detector, for example), the vertical reticle or crosshair requires moe sophisticated circuitry. A preferred embodiment of the present invention utilizes the vertical reticle injector circuitry depicted in FIG. 9, wherein the vertical reticle may be continuously adjusted in width and position. The vertical reticle injector utilizes the aforementioned triangular waveform, which is generated utilizing a Hall-effect transistor in conjunction with a permanent magnet mounted on the scanning mirror. The triangular waveform at an intermediate stage of processing is applied to the input of a high gain operational amplifier 901, and quickly saturates amplifier 901, resulting in an output signal which is representative of the highly amplified triangular wave form, about the zero volt reference. The output of amplifier 901 is coupled to a voltage divider comprised of variable resistor R902 and then is applied to the inputs of two unity gain inverting amplifiers, amplifiers 904 and 906. Amplifier 906 includes a gain adjustment resistor R908, which is utilized to ensure equal gains in amplifiers 904 and 906. Amplifier 904 includes a width adjustment resistor R910, which is utilized to control the magnitude of the DC output level.

The outputs of amplifiers 904 and 906 are coupled to comparators 920 and 922 respectively. Comparators 920 and 922 compare the outputs of amplifier 904 and 906 with a common, adjustable, DC reference voltage. As those skilled in the art will appreciate, when the potential difference across the input of either comparator changes polarity, the digital outputs of the comparator will change state. Connected to the outputs of comparators 920 and 922 are three NAND gates 930, 932 and 934. These three NAND gates form the equivalent circuit of an exclusive NOR configuration, thus taking advantage of the complementary nature of the outputs of comparators 920 and 922. The output of NAND gate 934 will be high when the output states of comparators 920 and 922 are identical and low when the output states of comparators 920 and 922 are dissimilar. The output states of comparators 920 and 922 will differ when a voltage polarity change occurs between the DC reference voltage, and the output of amplifier 904 or 906, but not both. A low output from NAND gate 934 generates a vertical reticle by coupling an appropriate signal to the multiplexer load resistor.

Figure 10A:
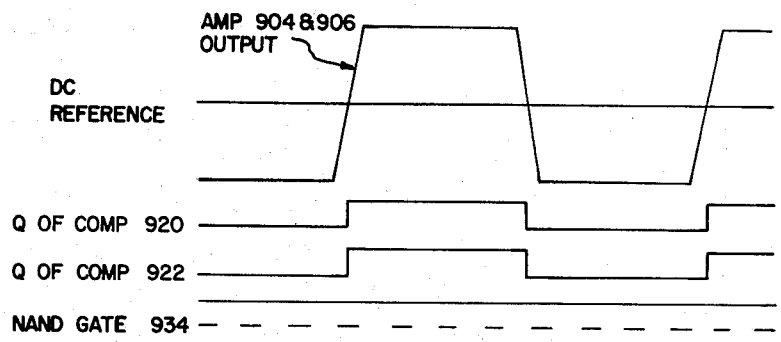
FIGS. 10a through 10c are a series of timing diagrams and voltage waveforms which demonstrate the operation of the vertical reticle injector circuitry.
Figure 10B:
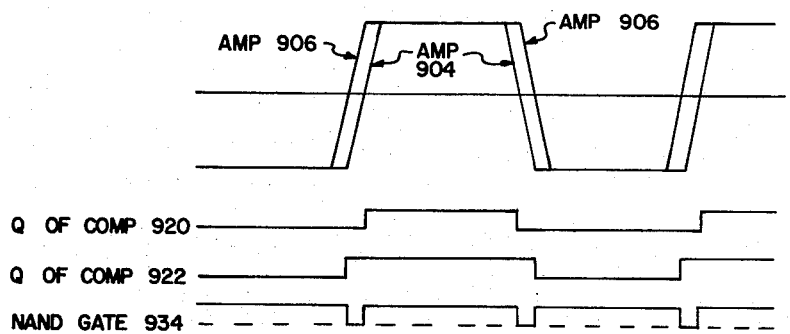
Figure 10C:
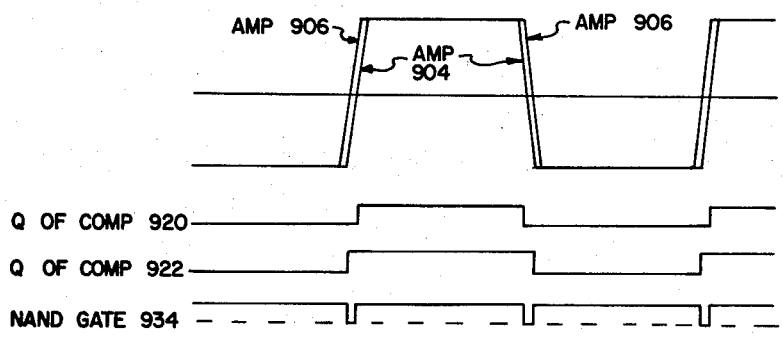

An increased understanding of the operation of the vertical reticle injector circuitry may be obtained by reference to the voltage waveform depicted in FIGS. 10a through 10c. FIG. 10a depicts the voltage waveforms present in the vertical reticle injector circuitry in a situation where no difference level exists between the outputs of amplifier 904 and the output of 906. The output states of comparators 920 and 922 will change states as the polarity of their inputs change; however, since the changes occur in unison, the output of NAND gate 934 will stay high, and no vertical reticle will be generated.

In FIG. 10b, a difference in output levels of amplifiers 904 and 906 is provided, utilizing the width adjustment resistor R10. The outputs of amplifiers 904 and 906 will cause comparators 920 and 922 to change states at slightly different times. Thus, the output of NAND gate 934 will go low for those periods of time during which the outputs of comparators 920 and 922 differ, and a vertical reticle will be generated.

As can be seen in FIG. 10c, when the DC output level difference is quite small, the signal utilized to generate the vertical reticle is proportionally narrower, yielding a narrower reticle. The position of the vertical reticle may be varied by adjusting position adjustment resistor R925. Resistor R925 will adjust the DC reference voltage present at the negative inputs to comparators 920 and 922 and will therefore have a concomitant effect upon the particular point in time at which comparators 920 and 922 change states, thus controlling reticle position.

Referring again to FIG. 9, it can be seen that the solenoid signal (SDL) from the torque motors of the scanning mirror is also applied to amplifier 901 through phase shift resistor R905. This phase shifting signal will generate a change in the DC output level of amplifier 901; however, this phase shift signal will have no effect upon the reticle generation, since this phase shift will affect the outputs of amplifiers 904 and 906 identically. This phase shift is generated in a similar fashion to the phase shift discussed with respect to the X-axis circuitry, and is also utilized to compensate for possible mechanically derived effects or electronic distortion.

ALTERNATIVE EMBODIMENTS

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

What is claimed is:

1. An electro-optical system comprising:
   an array of radiation detecting elements;
   a rotatable scanning means arranged to scan radiation across said array, including means for generating an analog signal indicative of the rotation thereof;
   an electronic multiplexer for sequentially sampling the outputs of the detecting elements in said array; and
   a visual display system including a scanned raster device having a spot intensity modulator coupled to the output of said multiplexer and at least one sweep circuit driven by said analog signal.

2. The electro-optical system according to claim 1, wherein the rotation of said rotatable scanning means is reciprocal in nature.

3. The electro-optical system according to claim 2, wherein said analog signal comprises a tri-angular waveform.

4. The electro-optical system according to claim 3, wherein said means for generating said analog signal includes a Hall-effect transducer.

5. The electro-optical system according to claim 1, wherein said visual display system further includes a plurality of radiation emitters coupled to the output of said detecting elements.

6. The electro-optical system according to claim 5, wherein said plurality of radiation emitters comprises a plurality of light emitting diodes.

7. The electro-optical system according to claim 1, wherein said array of radiation detecting elements comprises a plurality of infrared radiation detecting elements.

8. An electro-optical system comprising:
   an array of radiation detecting elements;
   a rotatable scanning means arranged to scan radiation across said array;
   an electronic multiplexer for sequentially sampling the outputs of the detecting elements in said array; and
   a visual display system including a scanned raster device having a spot intensity modulator coupled to the output of said multiplexer, a horizontal sweep generator and a vertical sweep generator, said vertical sweep generator operating at a constant rate and said horizontal sweep generator operating independently of said vertical sweep generator.

9. The electro-optical system according to claim 8, wherein said visual display system further includes a plurality of radiation emitters coupled to the output of said detecting elements.

10. The electro-optical system according to claim 9, wherein said plurality of radiation emitters comprise a plurality of light emitting diodes.

11. The electro-optical system according to claim 8, wherein said array of radiation detecting elements comprise a plurality of infrared radiation detecting elements.

12. The electro-optical system according to claim 8, wherein the output of said horizontal sweep generator is an analog signal corresponding to the instantaneous angular position of said rotatable scanning means.

13. The electro-optical system according to claim 8, wherein the output of said vertical sweep generator comprises a periodic signal, the period of which corresponds to the amount of time required by said electronic multiplexer for sequentially sampling the output of each of said detecting elements.

14. An electro-optical system comprising:
an array of radiation detecting elements;
a rotatable scanning means arranged to scan radiation entering the system across said array;
an electronic multiplexer for sequentially sampling the outputs of the detecting elements in said array including means for integrating the output of each detecting element between successive samplings of said detecting element; and
a visual display system including a scanned raster device having a spot intensity modulator coupled to the output of said multiplexer.

15. The electro-optical system according to claim 14, wherein said array of radiation detecting elements comprise a plurality of infrared radiation detecting elements.

16. The electro-optical system according to claim 14, wherein said visual display system further includes a plurality of radiation emitters coupled to the output of said detecting elements.

17. The electro-optical system according to claim 16, wherein said plurality of radiation emitters comprise a plurality of light emitting diodes.

18. The electro-optical system according to claim 14, wherein said integrating means includes a capacitor, and means for rapidly discharging said capacitor after each successive sampling of said detecting element.

19. In an electro-optical system having an array of radiation detecting elements, a rotatable scanning means arranged to scan radiation across said array, an electronic multiplexer for sequentially sampling the outputs of the detecting elements in said array and a scanned raster display device, a method for visually displaying the output comprising the steps of:
generating an analog signal indicative of the rotation of said rotatable scanning means;
utilizing said analog signal as a first sweep signal in a first axis of said scanned raster display device;
providing a second sweep signal in a second axis of said scanned raster display device; and
modulating the intensity of the display of said scanned raster display device in accordance with the output of said electronic multiplexer.

20. The method according to claim 19 wherein said second sweep signal is independent of said first sweep signal.

21. The method according to claim 19 wherein said analog signal comprises a triangular waveform.

22. In an electro-optical system having an array of radiation detecting elements, a rotatable scanning means arranged to scan radiation across said array, an electronic multiplexer for sequentially sampling the outputs of the detecting elements in said array and a scanned raster display device, a method for visually displaying the output comprising the steps of:
generating horizontal and vertical sweep signals and applying said sweep signals to said scanned raster display device;
integrating the output of each detecting element in said array between successive samplings of said detecting element; and
modulating the intensity of the display of said scanned raster display device in accordance with said integrated outputs.

23. The method according to claim 22 wherein said horizontal sweep signal is independent of said vertical sweep signal.

24. In an electro-optical system having an array of radiation detecting elements, a rotatable scanning means arranged to scan radiation across said array, an electronic multiplexer for sequentially sampling the outputs of the detecting elements in said array and a scanned raster display device, a method of effectively equalizing the outputs of each of said detecting elements comprising the steps of:
providing an equal intensity test signal to each of said detecting elements;
integrating the output of each of said detecting elements across a resistive/capacitive network; and
adjusting said resistive/capacitive network to provide an equal intensity output from each of said detecting elements.

25. The method according to claim 24 wherein said adjusting step comprises the step of trimming the resistive element in said resistive/capacitive network.

26. The method according to claim 24 wherein said adjusting step comprises the step of trimming the capacitive element in said resistive/capacitive network.

27. In an electro-optical system having an array of radiation detecting elements, a rotatable scanning means arranged to scan radiation across said array, an electronic multiplexer for sampling the outputs of the detecting elements in said array and a display device, a method of decreasing effective buss capacitance at the output buss of said electronic multiplexer comprising the steps of:
sequentially sampling the outputs of each of said detecting elements;
selectively coupling said sequentially sampled outputs of each of said detecting elements to said output buss through a diode.

28. The method according to claim 27 wherein said selective coupling step comprises the step of controlling a switching transistor interposed between said detecting element and said diode.

29. In an electro-optical system having an array of radiation detecting elements, a rotatable scanning means arranged to scan radiation across said array, an electronic multiplexer for sequentially sampling the outputs of the detecting elements in said array and a scanned raster display device, a method for visually displaying the output comprising the steps of:
generating an external analog signal synchronized to the rotation of said rotatable scanning means;

utilizing said analog signal as a first sweep signal in a first axis of said scanned raster display device;

providing a second sweep signal in a second axis of said scanned raster display device; and modulating the intensity of the display of said scanned raster display device in accordance with the output of said electronic multiplexer.

30. The method according to claim 29 wherein said second sweep signal is independent of said first sweep signal.

31. The method according to claim 29 wherein said analog signal comprises a triangular waveform.

* * * * *